United States Patent Office 3,013,780
Patented Dec. 19, 1961

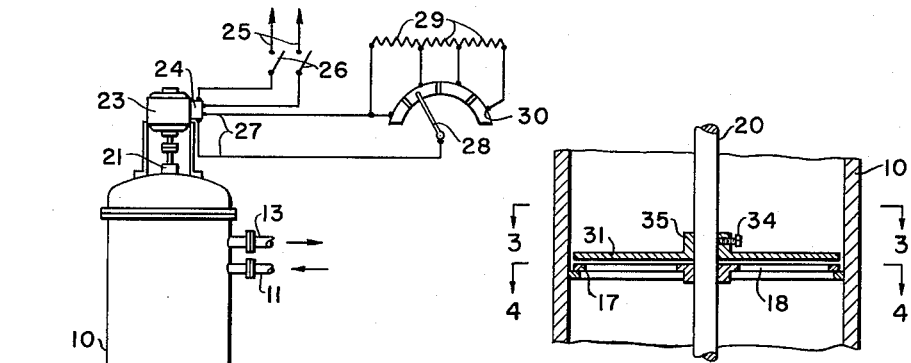
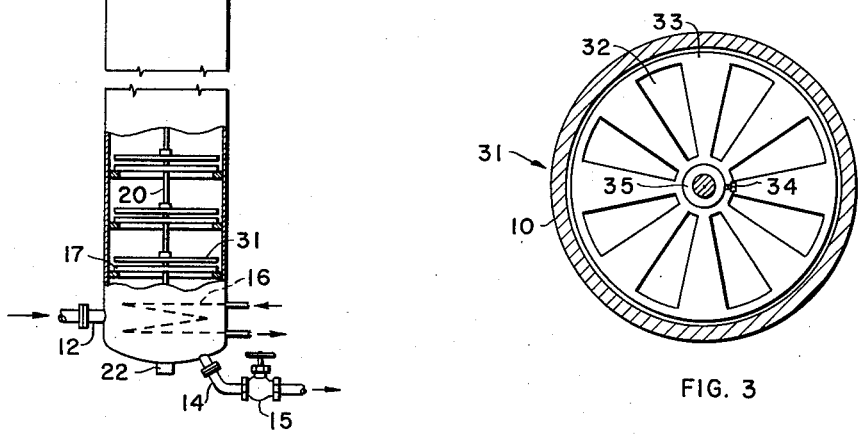
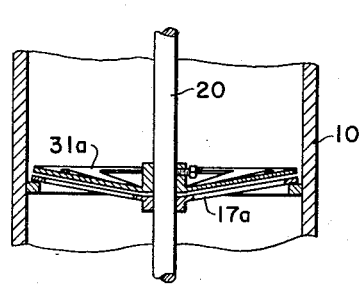
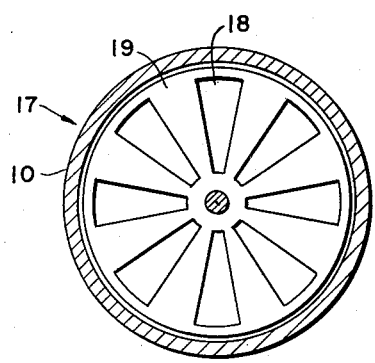

3,013,780
GAS-LIQUID CONTACTING APPARATUS WITH SHUTTER TRAYS
Harry A. Wistrich, Orinda, Calif., assignor to Shell Oil Company, a corporation of Delaware
Filed Dec. 9, 1957, Ser. No. 701,375
10 Claims. (Cl. 261—84)

The invention relates to apparatus for effecting intimate contact between a gas and a liquid which flow countercurrently through a contacting vessel which contains contacting trays, the term "gas" being used to include vapor. More particularly, the invention is concerned with an improved tray. It may be applied to such varied uses as fractional distillation, scrubbing of gases and absorption.

Contacting apparatus employing trays which are mounted in spaced relation within a column for accumulating liquid and contain passages for subdividing the ascending gas into smaller streams for engaging the accumulated liquid to effect an interaction therewith, such as the exchange of constituents, are designed for particular operating conditions, of which the loading conditions are the most important. For any loading (flow rates of the liquid and gas and their relative densities) the contacting efficiency and capacity of the tray are determined by the tray design. For example, in many types of trays, such as those having flow passages of suitable outlines for the upflow of gas and the downflow of liquid, e.g., grid trays having slots formed in a plate by casting or perforating the plate or by mounting parallel grid bars at a common level, the free area and width of the passages are designed with a particular loading in view. When the sizes of the passages and their aggregate area, also called free area, are reduced the consequence is usually increased contacting efficiency and reduced capacity of the tray to handle the fluids.

Such trays can be operated only over limited ranges of flow rates fi the contacting efficiency is to remain at an acceptable level. When the rate of fluid flow is, for any reason, altered significantly it is necessary to replace such trays by others having different operating characteristics.

It is known to make contacting trays adjustable, as by providing adjustable, auxiliary plates with openings which can be positioned to obstruct the openings to different degrees; however it is necessary in order to make such an adjustment to shut down the column. When such adjustable parts are provided with externally controllable actuating devices the latter tend in practice to be unreliable, due to the fouling and corrosion which frequency occurs and, moreover, such devices are costly and usually lack the precision necessary to bring all of the trays to precisely the required operating characteristics.

It is the object of this invention to provide an improved gas-liquid contacting apparatus having a tray which can be operated to achieve a variable operating characteristic independently of the fluid flow rates.

A specific object is to provide a column having a tray which can be operated to achieve a controlled change in the relation between the contacting efficiency and the capacity of the tray.

In summary, according to the invention the column contains one or more trays having a plurality of large flow passages and each tray is provided with a shutter which is operated continuously, preferably at a controlled, variable speed, to alternately uncover the passages and at least partially obstruct them. By this construction a cyclic variation in the available flow area is attained and it is possible to control the cyclic pattern readily by altering the frequency of the cyclic to vary the operating characteristics of the tray.

The invention will be further described with reference to the accompanying drawing which forms a part of this specification and shows certain illustrative embodiments. In the drawing:

FIGURE 1 is an elevation view of a column containing the shutter trays of the invention, parts being broken away;

FIGURE 2 is an enlarged, vertical sectional view of a part of the column;

FIGURES 3 and 4 are transverse sectional view taken on the lines 3—3 and 4—4, respectively, of FIGURE 2; and FIGURE 5 is a vertical sectional view of a part of a column showing a modified construction.

Referring to FIGURES 1-4, the apparatus comprises an upright, cylindrical column 10 of circular cross section having upper and lower inlet pipes 11 and 12 for liquid and gas, respectively, and upper and lower discharge pipes 13 and 14 for gas and liquid, respectively, the last of these having a flow-control valve 15. It is understood that, as applied to fractional distillation, the liquid entering the pipe 11 would consist of reflux which is a part of the condensate obtained by condensing vapor from the pipe 13; and that the gas admitted through the pipe 12 could be vapor generated by reboiling the liquid drawn off through the pipe 14. In addition to or in lieu of such gas-inlet pipe, vapor can be generated with the column by an internal reboiler coil 16, through which a heating fluid is circulated.

The column contains a series of vertically spaced, stationary, horizontal trays 17, each of which has a plurality of large passages 18 of any suitable outlines. As is shown in FIGURE 4 there may be eight of these passages and they may be substantially sector-shaped and occupy collectively almost half of the tray area, leaving sector-shaped imperforate parts 19 joined at the center for structural support. However, other free areas, e.g., from 25% to 75%, and a different number of passages may be used. The column contains a central, vertical drive shaft 20 which extends with small clearances through central openings in the trays, is journalled at the top and bottom of the column in bearings at 21 and 22, and is coupled to a suitable drive means, such as electrical motor 23. The drive means is preferably of the type which can be operated at different speeds.

For example, the motor can be a wound-rotor A.C. motor having the field winding thereof connected through a terminal strip 24 to a constant-potential electrical power circuit 25, controlled by a switch 26. The armature winding is connected to the said power circuit by way of a circuit 27 and controller 28. The controller includes a plurality of electrical resistance elements 29 which are connected in series and the termini of each element are connected to an adjacent pair of contact points 30 of the controller. It is evident that a variable number of these resistance elements can be connected across the circuit 27 or the circuit can be short-circuited, to apply a variable voltage to the motor winding and thereby effect operation at a desired speed.

The drive shaft 20 carries fast thereto a plurality of shutter plates 31, there being one such plate for each tray in parallel relation thereto and near it, e.g., above it as shown. These plates need not be contiguous to the trays and are preferably mounted with small clearances, as described below, sufficient to insure frictionless operation. Each shutter plate has a plurality of openings 32 which are shaped like the passages 18. They are preferably positioned so that all of the openings 32 can be simultaneously in register with the passages. The imperforate, sector-shaped portions 33 of the shutter plate obstruct the passages 18 in certain angular positions of the plate, and should be wide enough to effect at least significant obstruction in these positions. It is not, however, essential that they effect a complete obstruction. They may, moreover, be somewhat wider than the passages 18. The shutter plates are fastened to the shaft at the desired relations to the trays by set screw 34.

As was indicated previously, it is not necessary that the shutter plate seal off the passage 18; it is in fact, preferred to prevent this, by providing a vertical clearance between the tray and plate and/or by making the imperforate portions 33 slightly narrower than the passages. For example, it is advantageous to provide a minimum free area through the tray-shutter assembly of approximately 2-8% when the shutter plate is in its most obstructing position, and to this end the plate can be spaced from one-quarter inch to one inch above the tray.

The several shutters are oriented on the shaft preferably so that all are simultaneously in obstructing position with respect to their respective trays.

In operation, the gas and liquid are flowed in countercurrent through the column and the motor 23 is operated at a suitable speed, e.g., 30 to 300 r.p.m. There being eight passages and openings, the shutters move into obstructing positions eight times during one revolution. The gas and liquid flow through the column with pulsating movements. When the shutter plates are in obstructing positions flow is substantially stopped and liquid is accumulated on each tray, and flow is resumed when the openings 32 and in register with the passages 18. Thus, during the rotation of the shaft, the available area for gas-liquid flow alternates between a maximum, when the shutter openings 32 are superimposed as fully as possible over the passages 18, to and a minimum, when the imperforate shutter portions 33 are similarly superimposed over the passages. The gas-liquid contacting operation, therefore, cycles between a high free-area, low pressure drop, high capacity and low efficiency period, and a low free-area, high pressure drop, low capacity and high efficiency period. The frequency of such cycles can be readily controlled by changing the speed of the shaft 20. Thus, when the shaft operates at 100 r.p.m. there are 800 cycles per minute or nearly 13 per second.

By increasing the shaft speed the frequency of the cycles is increased. Due to the time required for the flow of the fluids to become significant when the shutter moves to open the passages, less flow occurs at higher frequencies although the ratio of the times that the passages are uncovered and obstructed is constant. Hence, an increase in the shaft speed has the effect of increasing the efficiency and pressure drop and in reducing the capacity, and vice versa.

At high operating speeds the shutter plate tends to throw the fluids toward the column wall. This can be corrected by sloping the trays down toward the center, as is shown in FIGURE 5. In this embodiment the tray 17a and the shutter plate 31a are frusto-conical with the lowest parts at the shaft, so that liquid is induced to flow toward the center and thereby counteract maldistribution due to centrifugal forces.

It is evident that although sector-shaped passages were described, the invention is not limited thereto.

I claim as my invention:

1. Gas-liquid contacting apparatus comprising: an upright vessel which contains a transverse tray, said tray having imperforate areas adapted to accumulate liquid and a plurality of passages large enough for the downward flow therethrough of liquid substantially unhindered by the upward flow of gas through the said passages; movable shutter means situated adjacently to the tray at a distance less than the smallest horizontal dimension of said passages for alternately opening and at least partially obstructing said passages and thereby repetitively impeding the flow of said fluids therethrough; drive means for moving said shutter rapidly and repetitively between open and obstructing positions; and means for flowing a gas upwards and a liquid downwards through said vessel and through said passages.

2. Apparatus according to claim 1 wherein said shutter means includes a rotatably mounted shutter plate disposed parallel to and close to the tray and having openings therein positioned for registry with the said passages, and said drive means includes a vertical, rotatable drive shaft connected to said shutter plate.

3. Apparatus according to claim 2 wherein said tray and plate are substantially flat and horizontal.

4. Apparatus according to claim 2 wherein said shutter plate is mounted above the tray and said tray and plate are shaped with a central depression and a raised outer portion.

5. Apparatus according to claim 1 wherein said shutter means includes walls having relative positions to obstruct at least partially and simultaneously all of the said passages, said shutter means having openings positioned for simultaneous registry with the said passages.

6. In combination with the apparatus according to claim 1, means for operating said drive means at different speeds.

7. Gas-liquid contacting apparatus comprising: an upright vessel; a plurality of horizontal, vertically spaced trays within said vessel, each said tray comprising a plurality of imperforate areas and a plurality of passages for fluids; a vertical drive shaft extending through said trays; means for rotating said shaft; a plurality of shutters fixed to said shaft in parallel relation to the respective trays, each said shutter including imperforate wall portions positioned to overlie the tray passages simultaneously and having openings positioned for simultaneous registry with said passages, said passages in the tray openings and the said openings in the shutter being large enough for the downward flow of liquid therethrough substantially unhindered by the upward flow through the same passages and openings, each of said shutters being spaced from the respective tray by a distance less than the smallest horizontal dimension of said passages for repetitively impeding the flow of said fluids therethrough; means for flowing liquid down through the vessel and through said passages; and means for flowing a gas upwards through the vessel and through said passages.

8. Gas-liquid contacting apparatus according to claim 7 wherein the several shutter plates are oriented to the shaft so that all shutter plate openings on the several shutter plates are in simultaneous registry with the respective tray passages.

9. Apparatus according to claim 7 wherein the means for rotating the shaft includes variable-speed drive means for rotating the shaft at different speeds.

10. Gas-liquid contacting apparatus according to claim 7 wherein said imperforate areas of the trays and the imperforate wall portions of the shutters are substantially sector-shaped and the said passages and openings are also substantially sector-shaped.

References Cited in the file of this patent

UNITED STATES PATENTS

| 940,947 | Steger | Nov. 23, 1909 |
|---|---|---|
| 2,265,762 | McKittrick et al. | Dec. 9, 1941 |
| 2,672,406 | Carney | Mar. 16, 1954 |
| 2,745,372 | Chertoff | May 15, 1956 |
| 2,793,847 | Steele | May 28, 1957 |
| 2,831,666 | Compton | Apr. 22, 1958 |
| 2,838,362 | Robert et al. | June 10, 1958 |

FOREIGN PATENTS

| 52,829 | Denmark | May 1, 1937 |
|---|---|---|
| 274,715 | Italy | May 31, 1930 |
| 404,261 | Great Britain | 1934 |